(No Model.) 2 Sheets—Sheet 1.
W. A. WILKINSON.
FRICTION CLUTCH.
No. 429,402. Patented June 3, 1890.
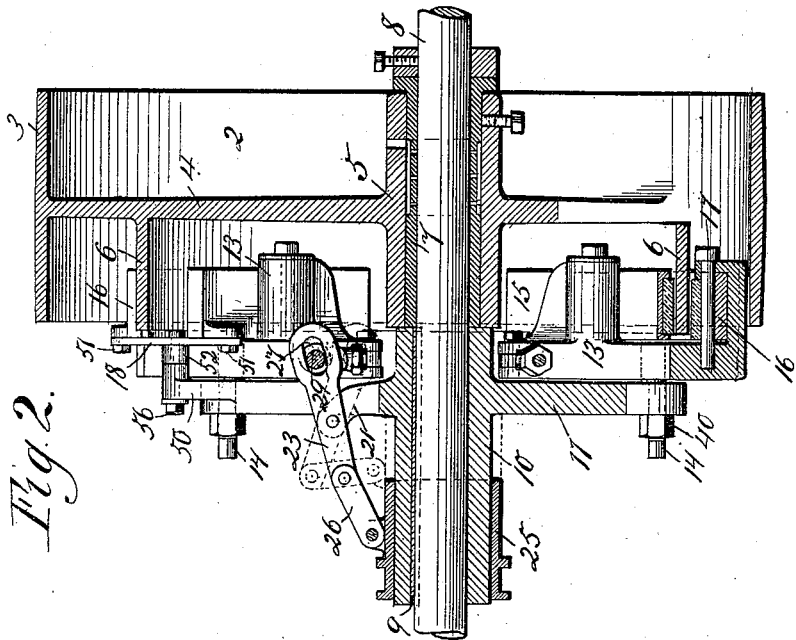
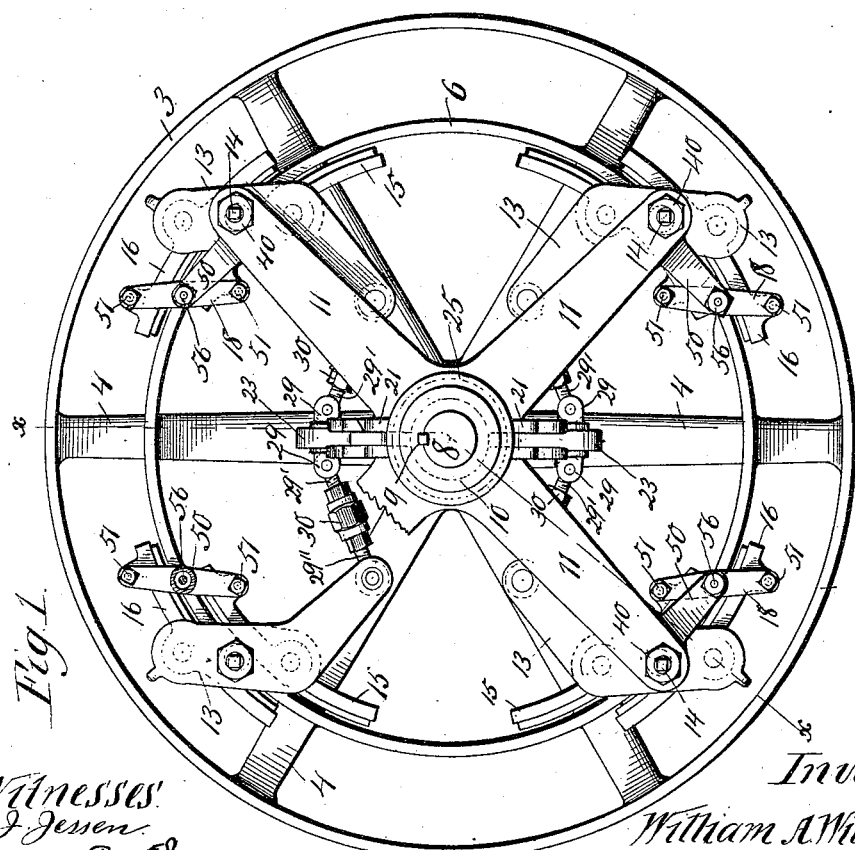
Witnesses:
J. Jessen
Bessie Booth
Inventor
William A. Wilkinson
By Paul   Att'ys
THE NORRIS PETERS CO., PHOTO-LITHO., WASHINGTON, D. C.

(No Model.) 2 Sheets—Sheet 2.
W. A. WILKINSON.
FRICTION CLUTCH.
No. 429,402. Patented June 3, 1890.
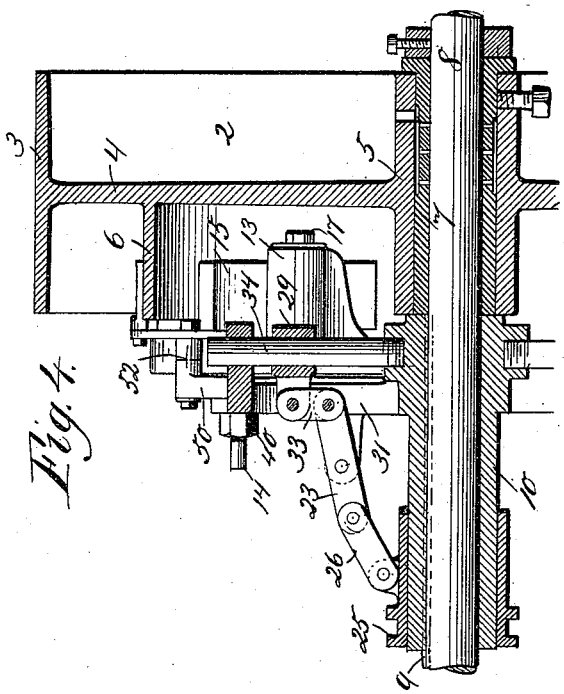
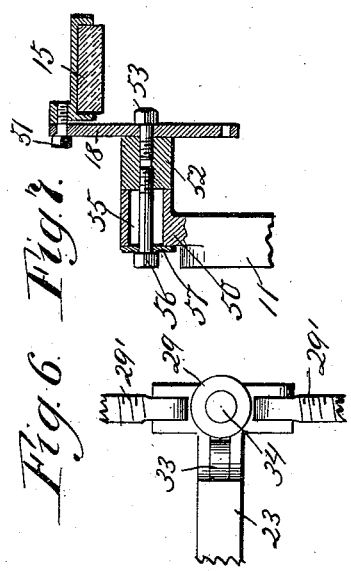
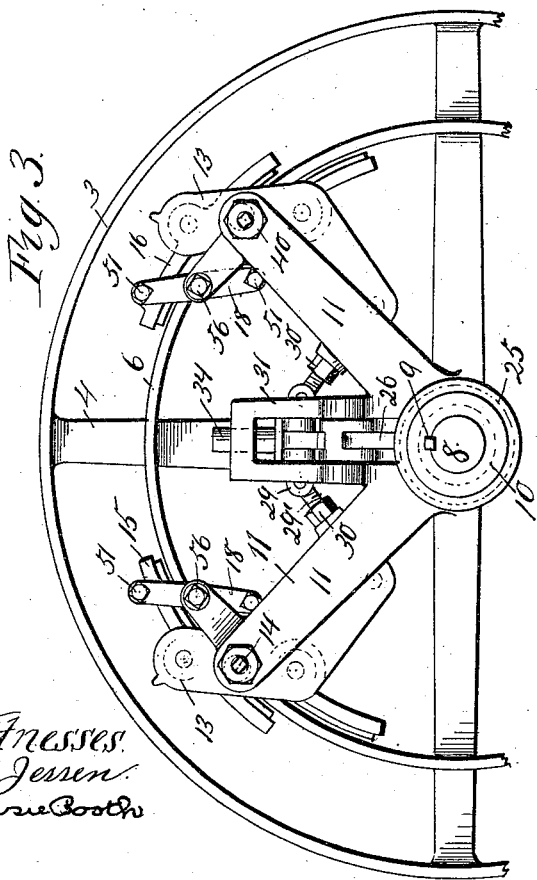
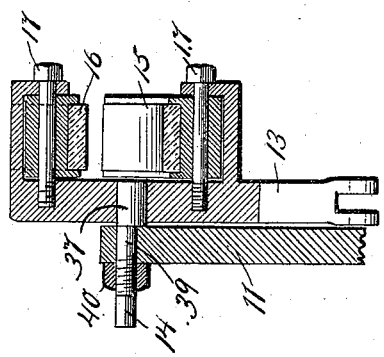
Witnesses
J. Jessen
Bessie Booth
Inventor:
William A. Wilkinson
By Paul Emerson Attys

UNITED STATES PATENT OFFICE.

WILLIAM A. WILKINSON, OF MINNEAPOLIS, MINNESOTA.

FRICTION-CLUTCH.

SPECIFICATION forming part of Letters Patent No. 429,402, dated June 3, 1890.

Application filed February 6, 1890. Serial No. 339,486. (No model.)

*To all whom it may concern:*

Be it known that I, WILLIAM A. WILKINSON, of Minneapolis, in the county of Hennepin and State of Minnesota, have invented certain Improvements in Friction-Clutches, of which the following is a specification.

My invention relates to belt-pulleys or other driving-wheels that are arranged so as to be clamped or secured when desired to the shafts upon which they are loosely mounted.

My invention is particularly adaptable to that class of machinery where a gradually-increasing motion is desired, such as is obtained by the use of a friction-clutch instead of an abrupt jaw or notched clutch.

In the accompanying drawings, forming a part of this specification, Figure 1 is an elevation of a pulley fitted with my improvements. Fig. 2 is a section on line $x\ x$ of Fig. 1. Fig. 3 is a partial elevation of a modified construction of a pulley with my improvements. Fig. 4 is a detail section of the construction shown in Fig. 3. Fig. 5 is a sectional detail of the clutch-shoes. Fig. 6 is a detail of the sliding shoes. Fig. 7 is a detail of the connecting-bar on the shoes.

In the drawings, 2 represents a pulley having the rim 3, the web or spokes 4, and hub or core 5. On the web or spokes 4 is firmly secured a flange 6, upon which the mechanism of the friction clutch is adapted to operate. The pulley 2 is mounted upon a sleeve 7, upon which it is fastened by a set-screw, and which turns on the shaft 8. Keyed to the shaft 8 by means of the spline 9 is the hub 10, having the radial arms 11, preferably four in number, and constructed integrally with said hub 10, and upon each of which is pivotally secured the shoe-holder 13 by means of the pivot 14. Upon the shoe-holder 13 is pivotally secured the shoes 15 and 16 by means of the bolts 17. The shoes 15 and 16 are pivotally connected also by the bar 18, preferably parallel to a line between the bolts 17, connecting the shoes to the holder 13. The bar 18 is also pivotally secured to the projection 50 of the arm 11, as shown in Fig. 7, wherein the shoe 15 is shown in section connected to the bar 18 by means of the pivot 51, the other shoe being removed. The bar 18 is secured to a block 52 by means of the pivot 53, having its end screw-threaded to be screwed into the block 52. The projection 50 of the arm 11 is provided with an opening 55 in its outer end of considerably larger diameter than the pivoting-bolt 56, which passes through said opening, and is also provided with a screw-threaded end adapted to be screwed into the block 52, a washer 57 being provided, through which the pivot 56 passes, and which has its bearings upon the upper surface of the projection 50. When it is desired to adjust the shoes, the pivot-bolt 56 is loosened, when the block 52, carrying the shoes and the washer 57, may be moved around within the opening in the end of the projection 50 until the proper adjustment is made, when, by tightening the pivot 56, the shoes are secured in the position required, so that as the shoes are rotated upon the pivot 14 by means of the shoe-holder the eccentric surfaces of the inner and outer shoes approach or recede from each other alike at all points. The four radial arms 11 are so arranged that two are on one side of the shaft 8 and two on the other, forming two pairs, the shoes on each pair being arranged oppositely thereon, so that when the inner ends of the holders 13 are pushed away from the center line between the pairs of arms 11 they cause the inner and outer shoes on each arm to approach each other, gripping the intervening flange 6, and when the inner ends of holders 13 are drawn toward each other the shoes 15 and 16 will be spread apart, loosening them from said flange.

Between the radial arms 11, forming each pair, is a projecting lug 21, formed integrally with the hub 10, and to which is pivoted the lever 23, one end of which is pivotally secured to a sliding collar 25, arranged to slide on the hub 10 by means of the link 26. The other end is provided with an opening 27, as shown in Figs. 1 and 2, in which is held the sliding block 29, which is in turn pivotally secured to the shoe-holder 13 by means of the threaded rods 29' and 29", connected adjustably to the turn-buckle 30. The sliding block 29 may be arranged in the slotted arm 31, as shown in Figs. 3 and 4, if desired, in which case it is preferably pivotally connected to the lever 23 by means of the link 33 and adapted to slide on a rod or bolt 34, secured in the slotted arm 31. In either case the action is the same, so that when the collar 25 is pushed in toward the pulley it carries the block 29 by means of the pivoted lever 23 and its connecting-links toward the shaft 8, pushing the shoe-holders 13 by means of the connecting-rods away from the shaft, causing the pulley 2, to which the flange 6 is secured, to be rotated with it in case the shaft has the power applied to it, or vice versa, in case the power is applied to the pulley.

In order to facilitate the adjustment of the shoes I construct the pivots 14, which secure the shoe-holder 13 to the radial arm 11, so that they have an eccentric movement, by means of which I can, by revolving the pivot, bring the shoes into a position exactly parallel with each other and both equally distant from the flange, so as to cause them to grip the flange equally at all points. To do this the portion 37 of the pivot 14, passing through the shoe-holder 13, is made eccentric to the other portion 39, which passes through the radial arm 11. The pivot is then screw-threaded and a suitable nut 40 is provided for holding it in position, the end of the pivot being provided with a square or rectangular head by which it may be turned when desired.

By means of the turn-buckles 30 the connections between the shoe-holders and the sliding block 29 may be lengthened or shortened, and thereby cause the shoes to grip the flange with greater or less force.

The pulley being mounted on the independent sleeve may be provided with a suitable lubricating-opening connecting with openings in the sleeve to compensate for the wear of the shoes.

The sliding collar 25 is arranged upon the hub 10 and turns therewith, but at the same time slides freely thereon. The advantage of locating the sliding collar on the hub arises from the fact that the shaft is necessarily grooved to receive the spline that secures the hub to it, and by locating the sliding collar on the hub this groove can extend beyond the end of the hub.

I claim as my invention—

1. The combination of a pulley running loose upon a shaft, a flange secured to said pulley, a series of radial arms secured to said shaft, each carrying a pair of friction-shoes pivotally secured thereto and secured together by pivoted arms parallel to each other, one of said arms being adapted to be used as a lever for operating said shoes, a sliding collar, and suitable connection between said lever and said collar, substantially as described.

2. The combination of the loose pulley 2, flange 6, shoe-holders 13, with the shoes 15 and 16, pivotally secured thereto, the radial arms 11, secured to the shaft and carrying the shoe-holders 13, collar 25, sliding block 29, link 26, and turn-buckle 30, combined and constructed substantially as described, and for the purpose specified.

3. The combination of the pulley 2, having the flange 6 secured thereto, the hub 10, having the radial arms 11, carrying the pivoted shoe-holder 13, the shoes 15 and 16, pivoted upon said shoe-holders and secured together by bars parallel to each other, and suitable mechanism for rotating said shoe-holder on its pivot, substantially as described.

4. The combination of the pulley 2, flange 6, radial arms 11, shoe-holder 13, shoes 15 and 16, and eccentric pivot 14 for adjusting said shoes, and suitable levers connected to the collar 25 for rotating said shoe-holder on said pivot 14, substantially as described.

5. The combination, with a loose pulley, of the flange 6, the hub 10, having the arms 4, the sliding collar 25, the shoes 14 and 15, pivotally secured to the bars 13 and 18, the bars 13 and 18, pivotally and adjustably secured to the arm 4, and suitable mechanism connecting said collar 25 with said bar 13, whereby said bar 13 and bar 18 may be rotated about their pivots in the arm 4.

In testimony whereof I have hereunto set my hand this 31st day of January, 1890.

WILLIAM A. WILKINSON.

In presence of—
BESSIE BOOTH,
A. M. GASKILL.